(12) United States Patent
Fife et al.

(10) Patent No.: US 6,780,318 B2
(45) Date of Patent: Aug. 24, 2004

(54) METHOD FOR RECOVERING A DISPOSAL TRENCH WITH A BIOMAT SLIME, AND METHOD FOR OPERATING A WASTE TREATMENT VESSEL

(76) Inventors: Jerome Jay Fife, 1975 Joy Rd., Occidental, CA (US) 95465; Daniel Edmund Wickham, P.O. Box 83, Duncan Mills, CA (US) 95430

( * ) Notice: Subject to any disclaimer, the term of this patent is extended or adjusted under 35 U.S.C. 154(b) by 341 days.

(21) Appl. No.: 10/000,764

(22) Filed: Oct. 24, 2001

(65) Prior Publication Data

US 2002/0070162 A1 Jun. 13, 2002

Related U.S. Application Data

(60) Provisional application No. 60/309,946, filed on Aug. 6, 2001, and provisional application No. 60/243,852, filed on Oct. 30, 2000.

(51) Int. Cl.[7] .................................................. C02F 3/00
(52) U.S. Cl. ......................... 210/621; 210/629; 210/170
(58) Field of Search ................................. 210/621, 629, 210/170

(56) References Cited

U.S. PATENT DOCUMENTS

| | | | | |
|---|---|---|---|---|
| 3,603,788 A | * | 9/1971 | Miraldi et al. ................. | 378/67 |
| 4,449,072 A | * | 5/1984 | Osada .......................... | 315/58 |
| 5,204,001 A | | 4/1993 | Tonelli et al. .............. | 210/608 |
| 5,480,593 A | * | 1/1996 | Marcum et al. | |
| 5,531,898 A | * | 7/1996 | Wickham .................... | 210/606 |
| 5,645,732 A | * | 7/1997 | Daniels ....................... | 210/747 |
| 6,306,639 B1 | * | 10/2001 | Woods et al. ............ | 435/252.3 |

OTHER PUBLICATIONS

"Questions about Microsep Tec," www.nesc.wvu.edu/nsfc/forum/294996690.html, posted Sep. 29, 2003, comments by Dr. Daniel Wickham.*

"White Knight Technical Paper," http://www.envirocheck-inc.com/_disc1/00000018.htm posted Aug. 20, 2001.*

"Winter Piranha Considerations," http://www.envirocheck-inc.com/_disc1/00000018.htm, dated Aug. 20, 2001 (comments by Jerry Fife yo Hank Huber with cc: to Daniel Wickham).*

"Piranha Technical Paper," http://www.envirocheckinc.com/_disc1/00000015.htm, dated Aug. 20, 2001, describing use of a waste treatment system said to be stable "for the last full year."*

"International Organic Solutions," http://www.wateronline.com/ecommcenters/ios.html, downloaded Dec. 5, 2003.*

"In–Drain System," http://www.eljen.com/in–drain.html, downloaded Dec. 5, 2003.*

"Refugium page," http://www.geocities.com/Heartland/Valley/3389/reeftank/refugium.html.*

Hans–Eberhard Lorenz et al., U.S. patent application Publication No. U.S. 2002/0023875 A1, Publication date Feb. 28, 2002, Application No. 09/793,823, Clearing Waste Water Pipes of Grease Traps Clogged With Grease With a Grease Solvent, pps. 1–41.

Exhibit A—Contract Complaint, Case No. 229532, filed Mar. 18, 2002; Plaintiff: Robert W. Rawson: Defendant: Jerome J. Fife and Daniel E. Wickham.

Exhibit B—Depositions of Robert W. Rawson taken by the Defendants on Jul. 18 and 19, 2002.

* cited by examiner

Primary Examiner—Chester T. Barry
(74) Attorney, Agent, or Firm—Pillsbury Winthrop LLP

(57) ABSTRACT

A soil-based disposal trench that has failed from a biomat slime is recovered by adding a facultative anaerobic bacteria to an effluent that flows into the disposal trench. The facultative anaerobic bacteria consumes the biomat slime and, in one embodiment, supplants a strictly aerobic bacteria in the soil that converts nitrites to nitrates. As a result, the facultative anaerobic bacteria interrupt the conventional process of nitrification, changing the nitrites to nitrogen gas.

20 Claims, 11 Drawing Sheets

METHOD FOR RECOVERING A DISPOSAL TRENCH WITH A BIOMAT SLIME, AND METHOD FOR OPERATING A WASTE TREATMENT VESSEL

RELATED APPLICATION

This application claims priority from U.S. Provisional Patent Application Serial No. 60/243,852 filed on Oct. 30, 2000 for Air Driven Bacterial Generator/Inoculator/Aerator and from U.S. Provisional Patent Application Serial No. 60/309,946 filed on Aug. 6, 2001 for Method for Biological Denitrification of Wastewater.

BACKGROUND OF THE INVENTION

1. Field of the Invention

The present invention relates to waste treatment devices and, in particular, to a method of recovering a disposal trench with a biomat slime, and a method of operating a waste treatment vessel.

2. Description of the Related Art

In a conventional non-municipal waste system, waste material flows into a septic tank. The septic tank is a separator that separates the waste material into three distinct regions. The regions include a lower layer that is formed from solids settling out of the waste material, and an upper layer that is formed from lighter waste material floating to the top of the septic tank.

The regions of the septic tank also include a middle liquid layer, known as effluent, which is ideally free of solids and floating material. Significant components of the effluent include ammonia and dissolved organic compounds. Following the separation, the effluent flows out to a disposal trench that allows the effluent to seep into the soil.

The septic tank is a sealed vessel and, as a result of having no oxygen, is colonized by anaerobic bacteria. The anaerobic bacteria, however, are inefficient role in consuming or breaking down the waste material. However, as a result of the anaerobic bacteria being present in the septic tank, the effluent flowing out to the disposal field also includes anaerobic bacteria.

Once in the disposal trench, naturally occurring strict aerobic bacteria in the soil consume and break down the carbon-based material in the effluent stream. In addition, one type of strict aerobic bacteria converts the ammonia in the effluent stream into nitrites (NO2), while another type of strict aerobic bacteria converts the nitrites into nitrates (NO3).

One problem with a conventional septic tank is that, over time, the anaerobic bacteria in the effluent stream seal the bottom of, and then fill up, the disposal trench. As the anaerobic bacteria flow out into the disposal trench, the anaerobic bacteria move from the anaerobic (no oxygen) condition of the septic tank to the aerobic (oxygen available) condition present in the soil.

To insulate itself from the aerobic conditions in the soil (anaerobic bacteria die in the presence of oxygen), the anaerobic bacteria form a slime, known as a biomat. The biomat prevents the effluent from seeping into the soil, and eventually fills up the disposal trench, thereby preventing any further effluent from flowing into the disposal trench. When this happens, the septic system fails.

Another problem with a conventional septic tank is that the bacteria in the soil convert the ammonia in the effluent into nitrates. Nitrates are stable compounds and can leach into the aquifer and contaminate drinking water wells as well as pollute fresh and marine aquatic environments. Thus, there is a need for a method of operating a septic tank that prevents anaerobic bacteria in the effluent from forming a slime in the disposal trench, and prevents nitrates from being formed in the soil.

Municipal waste treatment facilities differ from non-municipal waste systems in that municipal waste systems typically treat and then discharge the effluent to a surface water system such as a river or lake. One of the treatments that must take place is the removal of ammonia from the effluent stream. Ammonia is toxic to fish and other aquatic organisms.

In many facilities, the effluent is aerated which, in turn, allows two types of strict aerobic bacteria to grow. The two types of strict aerobic bacteria that result from the aeration, like the strict aerobic bacteria in the soil, convert the ammonia first to nitrites, and then to nitrates. The nitrates, which are less toxic to fish than ammonia, are then discharged to the water system with the treated wastewater.

Nitrates discharged in wastewater, however, have a significant environmental impact. Nitrates are an important plant nutrient that, especially in near-shore marine environments, stimulates blooms of a wide range of noxious algae and dinoflagellates such as Alexandrium and Pfisteria, both of which are highly toxic.

A number of biological methods exist for de-nitrifying wastewater where the nitrogen in the ammonia is eventually converted to nitrogen gas or other gaseous nitric oxides. The resulting nitrogen gas, which makes up over 70% of the Earth's atmosphere, is entirely benign.

The most common method of de-nitrification used in municipal wastewater treatment systems is to first oxidize the ammonia to nitrite ($NO_2$) with bacteria such as Nitrosomonas or Nitrosococcus. The nitrite is then oxidized to nitrate ($NO_3$) using bacteria such as Nitrobacter. If this nitrate is then circulated to an anaerobic (no oxygen) zone in the presence of a sufficient amount of carbon, facultative anaerobic bacteria in the anaerobic zone can utilize the nitrate as an oxygen source to form $CO_2$. In the process, the nitrate is first converted to nitrite, and then to nitrogen gas.

One problem with this approach, however, is that it takes far more energy to convert the ammonia to nitrites, and the nitrites to nitrates than it does to circulate and aerate the carbonaceous organic material to oxidize the carbon and form $CO_2$. When aeration is used to convert the ammonia to nitrites, and the nitrites to nitrates, it takes almost five times the amount of aeration to oxidize ammonia to nitrate as it does to oxidize the carbonaceous organic material to form $CO_2$.

Thus, there is also a need for a municipal waste treatment system that removes nitrogen, including ammonia, nitrites, and nitrates, from the wastewater in a more energy efficient manner.

SUMMARY OF THE INVENTION

The present invention provides a method of recovering a soil-based disposal trench that has a biomat slime. The method includes the step of adding facultative anaerobic bacteria to an effluent that flows into the disposal trench. The step of adding facultative anaerobic bacteria to an effluent that flows into the disposal trench includes the steps of circulating the waste material in the treatment vessel, and adding facultative anaerobic bacteria to the treatment vessel. The circulation of the waste material causes the effluent that flows into the disposal trench to include facultative anaerobic bacteria.

The present invention also provides a method for operating a waste treatment vessel that holds waste material. The method includes the step of aerating and circulating the waste material in the treatment vessel until a predetermined number of a first type of strict aerobe and a second type of strict aerobe have colonized the treatment vessel. The first type of strict aerobe converting ammonia to nitrites, while the second type of strict aerobe converts nitrites to nitrates.

The method also includes the steps of adding facultative anaerobic bacteria to the treatment vessel. The facultative anaerobic bacteria added to the effluent substantially replace the second strict aerobic bacteria in the treatment vessel that convert nitrites to nitrates by exclusion and prevent them from recolonizing.

The present invention also includes a waste treatment device. The waste treatment device in accordance with the present invention includes an air diffuser that has a bubble output side that provides bubbles of air evenly across a diameter of a column that extends away from the bubble output side.

The waste treatment device also includes a bacteria container that is positioned within the column a predetermined distance away from the bubble output side of the diffuser. Bubbles passing by the bacteria container cause a bacteria to be released into a flow. The waste treatment device additionally includes a structure that contacts the bacteria container to position the bacteria container in the column.

The waste treatment device can also include a bacterial host material that is positioned within the column a predetermined distance away from the bubble output side of the diffuser. The bacterial host material is non-corrosive. The bacteria in the flow from the bacteria container grow on the bacterial host material.

The present invention also includes a method of operating a waste treatment device. The method includes the step of placing a facultative anaerobic culture in the bacteria container. The method also includes the step of forcing air into the diffuser so that air bubbles rise up through the column. Bubbles passing by the bacteria container cause bacteria from the culture to be released into a flow. The method further includes the step of directing the flow into a soil treatment system. In addition, the method of the present invention can also include the step of forming a nitrifying bacteria on the bacterial host material prior to placing the facultative anaerobic culture in the bacteria container.

A better understanding of the features and advantages of the present invention will be obtained by reference to the following detailed description and accompanying drawings that set forth an illustrative embodiment in which the principles of the invention are utilized.

DETAILED DESCRIPTION

Figure 1:
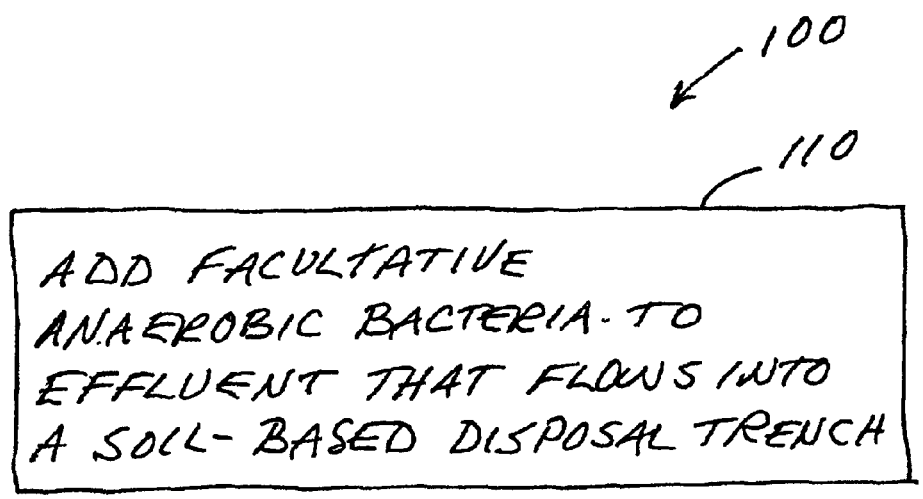
FIG. 1 is a flow chart illustrating a method 100 in accordance with the present invention.

FIG. 1 shows a flow chart that illustrates a method 100 in accordance with the present invention. As shown in FIG. 1, method 100 has a single step 110 of adding facultative anaerobic bacteria to an effluent that flows into a soil-based disposal trench that has a biomat slime.

The effluent includes ammonia, while the soil-based disposal trench is largely aerobic. Unlike the strict aerobes in the soil, which are ineffective in breaking down a biomat slime due to the moisture present in the slime, facultative anaerobic bacteria consume the biomat slime.

In accordance with the present invention, facultative anaerobic bacteria are added to the effluent in sufficient numbers over a sufficient time to insure a continual reduction in, and eventual elimination of, the biomat slime. Thus, the facultative anaerobic bacteria is added to the effluent so that the facultative anaerobic bacteria consumes the biomat slime faster than the biomat slime can be formed. Facultative anaerobic bacteria prefer aerobic conditions, but can operate for a period of time under anaerobic conditions, although much less efficiently under anaerobic conditions.

Facultative anaerobic bacteria do not require oxygen to break down biomat slime. As noted above, a first type of strict aerobe in the soil converts ammonia to nitrites, while a second type of strict aerobe in the soil converts the nitrites to nitrates.

In further accordance with the present invention, facultative anaerobic bacteria are added to the effluent stream in sufficient numbers over a sufficient time to insure that the facultative anaerobic bacteria vastly outnumber the second type of strict aerobes in the soil in the disposal trench. As a result, the nitrites in the disposal trench are largely consumed by the facultative anaerobic bacteria rather than the second type of strict aerobe in the soil.

When the facultative anaerobic bacteria consume nitrites, the nitrogen is released as nitrogen gas. As noted above, nitrogen gas is a benign substance that makes up a substantial portion of the atmosphere. In addition to nitrites, the facultative anaerobic bacteria also strip the oxygen from nitrates, breaking the nitrates into nitrites.

Thus, by displacing the second type of strict aerobe in the disposal trench soil, the present invention not only eliminates the biomat slime, but also eliminates nitrogen in the form of nitrates from the soil. As a result, the present invention allows failed treatment systems to be restored, and prevents ground water sources from being contaminated by near-by treatment systems.

Figure 2:
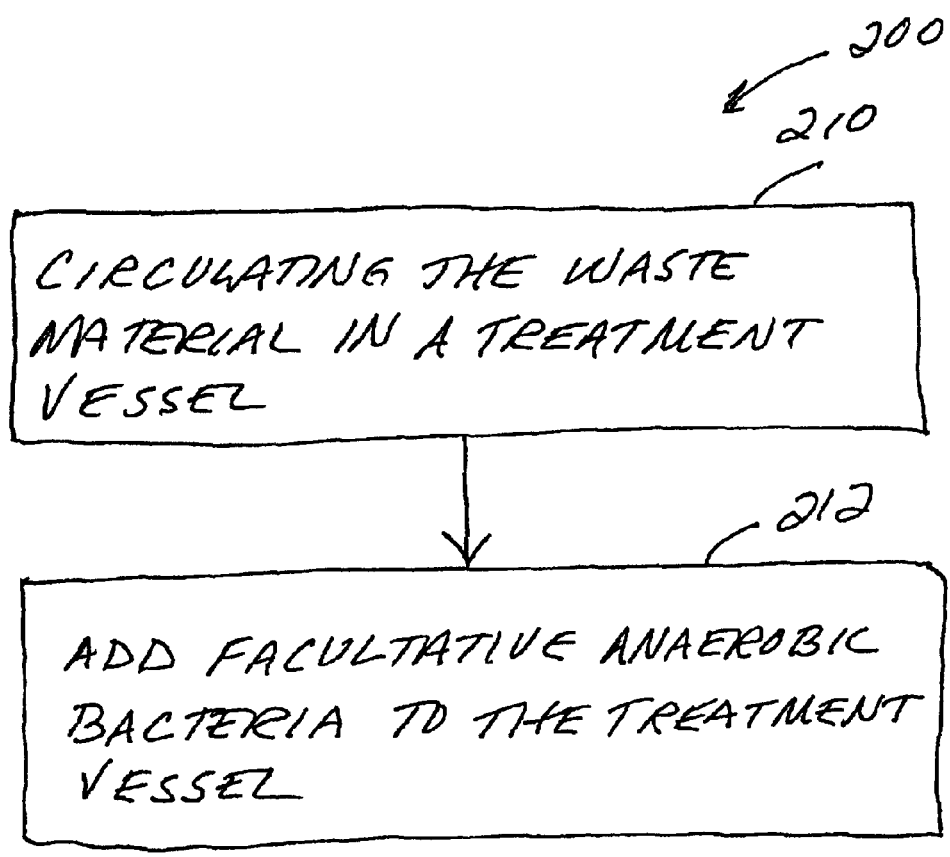
FIG. 2 is a flow chart illustrating a method 200 in accordance with the present invention.

FIG. 2 shows a flow chart that illustrates a method 200 in accordance with the present invention. Method 200 is an example of one way of implementing method 100. As shown in FIG. 2, method 200 begins at step 210 by circulating the waste material in a treatment vessel. The waste material includes effluent which, as noted above, includes ammonia. The waste treatment vessel can be implemented with, for example, a septic tank.

Following this, method 200 moves to step 212 to add facultative anaerobic bacteria to the treatment vessel. As a result of the circulation of the waste material, the effluent stream that flows into the disposal trench includes facultative anaerobic bacteria. The facultative anaerobic bacteria is added to the treatment vessel in sufficient numbers over a sufficient time to insure a continual reduction in, and eventual elimination of, the biomat slime. The facultative anaerobic bacteria can also be added to the treatment vessel in sufficient numbers over a sufficient time to establish an exclusionary environment which displace the second type of strict aerobic bacteria (that converts nitrites to nitrates) in the soil, thereby consuming substantially all of the nitrites in the disposal trench.

Figure 3:
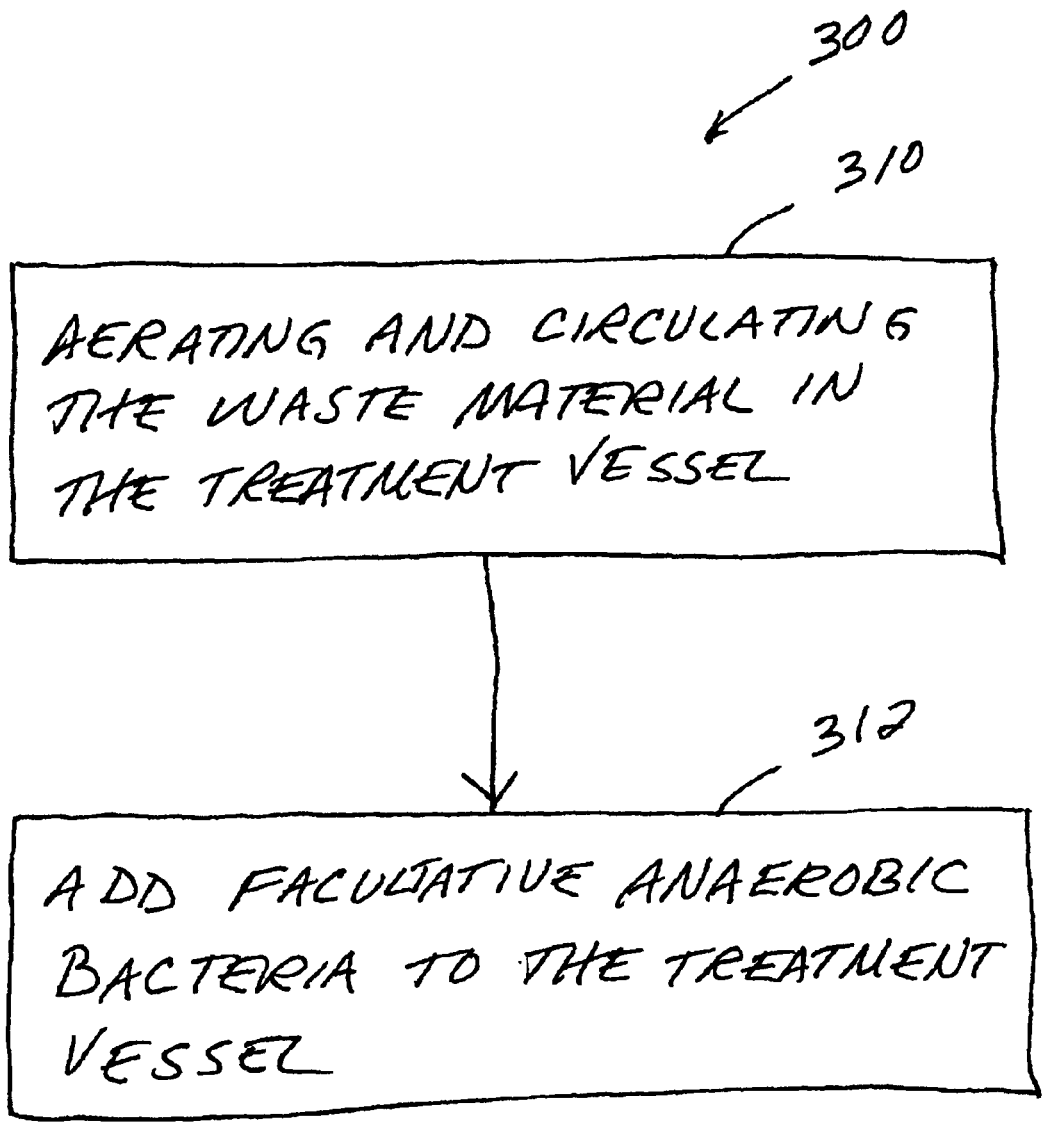
FIG. 3 is a flow chart illustrating a method 300 in accordance with the present invention.

FIG. 3 shows a flow chart that illustrates a method 300 in accordance with the present invention. Method 300 is another example of a way of implementing method 100. As shown in FIG. 3, method 300 begins at step 310 by aerating and circulating the waste material in the treatment vessel. The aeration step, which can be performed by an aerator bubbling air in the treatment vessel, substantially reduces, or eliminates, the number of anaerobic bacteria that are present in the treatment vessel.

Following this, method 300 moves to step 312 to add facultative anaerobic bacteria to the treatment vessel. As a result of the aeration and circulation of the waste material, the effluent stream that flows into the disposal trench includes facultative anaerobic bacteria.

As above, the facultative anaerobic bacteria are added to the treatment vessel in sufficient numbers over a sufficient time to insure a continual reduction in, and eventual elimination of, the biomat slime. The facultative anaerobic bacteria can also be added to the treatment vessel in sufficient numbers over a sufficient time to displace the second type of strict aerobic bacteria (that converts nitrites to nitrates) in the soil, thereby consuming substantially all of the nitrites in the disposal trench.

In addition, the aeration and circulation in the treatment vessel forms an aerobic region within the vessel that supports the growth of the facultative anaerobic bacteria. Further, the facultative anaerobic bacteria are introduced into the treatment vessel in numbers which allow the facultative anaerobic bacteria to become the dominant, if not the exclusive, bacteria that is present in the aerobic region.

For example, when an aerobic region is formed in a dead (no aerobic bacteria) treatment vessel, and the facultative anaerobic bacteria are then introduced to the aerobic region of the treatment vessel, the facultative anaerobic bacteria are substantially the only bacteria that are present.

Figure 4:
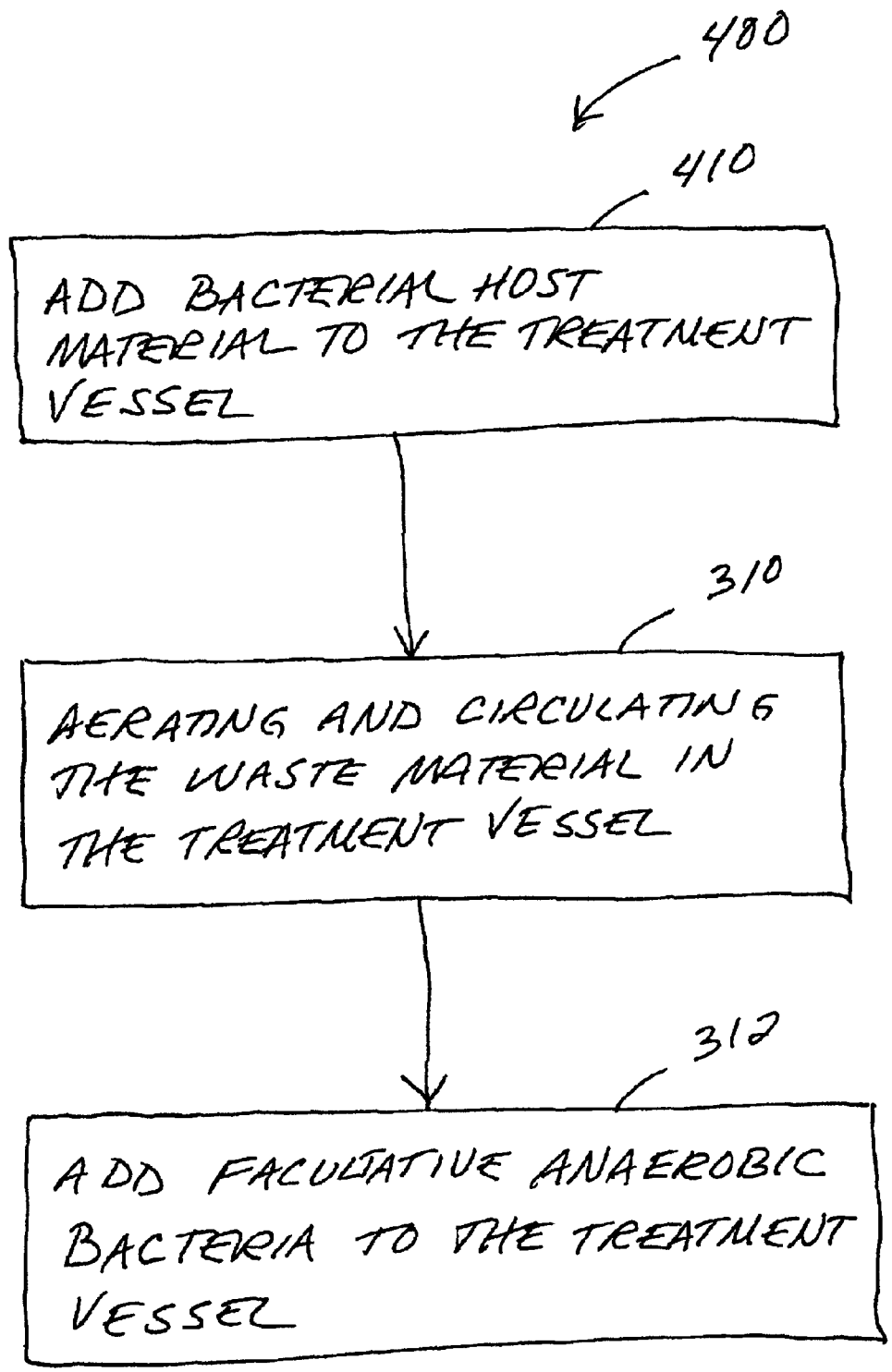
FIG. 4 is a flow chart illustrating a method 400 in accordance with the present invention.

FIG. 4 shows a flow chart that illustrates a method 400 in accordance with the present invention. Method 400 is similar to method 300 and, as a result, utilizes the same reference numerals to designate the steps that are common to both methods. As shown in FIG. 4, method 400 differs from method 300 in that method 400 includes step 410 which adds a bacterial host material to the treatment vessel.

The bacterial host material provides a surface for the facultative anaerobic bacteria to grow on that increases the number of facultative anaerobic bacteria that are present in the treatment vessel. In the preferred embodiment, the bacterial host material is placed adjacent to the aeration source so that the bacterial host material is bathed in air and waste material when the aeration source is in operation.

In method 300, the added facultative anaerobic bacteria colonize the treatment vessel, while in method 400 the added facultative anaerobic bacteria colonize the vessel and the bacterial host material, thereby providing a greater concentration of facultative anaerobic bacteria. In both cases, the facultative anaerobic bacteria are bathed in air and waste material.

Bathing the facultative anaerobic bacteria in air and waste provides an aerobic region within the treatment vessel where the facultative anaerobic bacteria can grow and digest the carbon-based waste material, substantially eliminating the presence of solids in the treatment vessel.

Further, the growing facultative anaerobic bacteria keep a range of facultative anaerobic bacteria in the effluent stream that flows out to the disposal trench. Thus, the present invention provides a means for continually inoculating the disposal trench with a range of the facultative anaerobic bacteria. In addition, as above, the aeration step substantially reduces, or eliminates, the number of anaerobic bacteria that are present in the treatment vessel.

Figure 5:
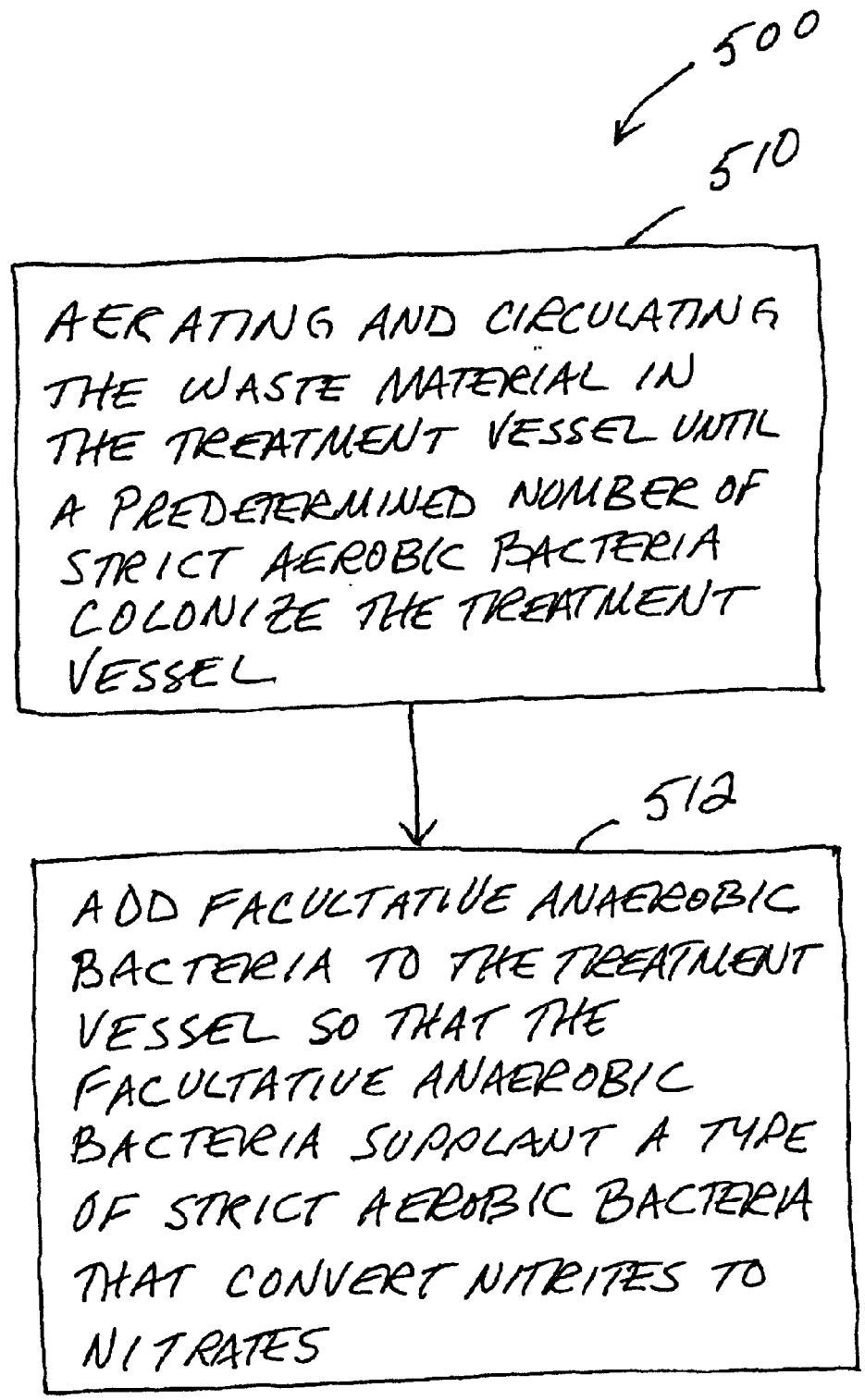
FIG. 5 is a flow chart illustrating a method 500 in accordance with the present invention.

FIG. 5 shows a flow chart that illustrates a method 500 in accordance with the present invention. As shown in FIG. 5, method 500 begins at step 510 by aerating and circulating the waste material in the treatment vessel. The aeration step forms an aerobic region within the treatment vessel.

In step 510, the waste material is aerated and circulated until a sufficient number of the first and second types of strict aerobes have colonized the treatment vessel. As noted above, the first type of strict aerobes convert ammonia to nitrites, while the second type of strict aerobes convert nitrites to nitrates. When the level of nitrates in the effluent in the treatment vessel reaches a predetermined level, a sufficient number of the first and second types of strict aerobes have colonized the treatment vessel.

The first and second types of strict aerobes can colonize the treatment vessel in two different ways. In the first way, wild spores from the outside air that is used to aerate the waste material are introduced into the aerobic region of the treatment vessel where the strict aerobes can grow and digest ammonia and nitrites.

The second way of growing nitrifying bacteria is to introduce an inoculum including commercial preparations of nitrifying genera, such as Nitrosomonas or Nitrococcus, into the treatment vessel. In both cases, the strict aerobes are able to thrive and colonize the treatment vessel because the volume of air from the aeration creates an aerobic condition.

Following this, method 500 moves to step 512 to add facultative anaerobic bacteria to the treatment vessel. The facultative anaerobic bacteria are added to the treatment vessel in sufficient numbers over a sufficient time to insure that the facultative anaerobic bacteria dominate, if not totally replace, the second type of strict aerobe (that converts nitrites to nitrates).

As a result, the first type of strict aerobe in the treatment vessel converts ammonia in the effluent into nitrites. At the same time, the facultative anaerobic bacteria, having supplanted the second type of strict aerobe, convert the nitrites into nitrogen gas, and consume the carbon-based waste material. Thus, method 600 not only eliminates substantially all of the solids from the treatment vessel, but also removes substantially all of the nitrogen from the effluent before the effluent even leaves the treatment vessel.

Figure 6:
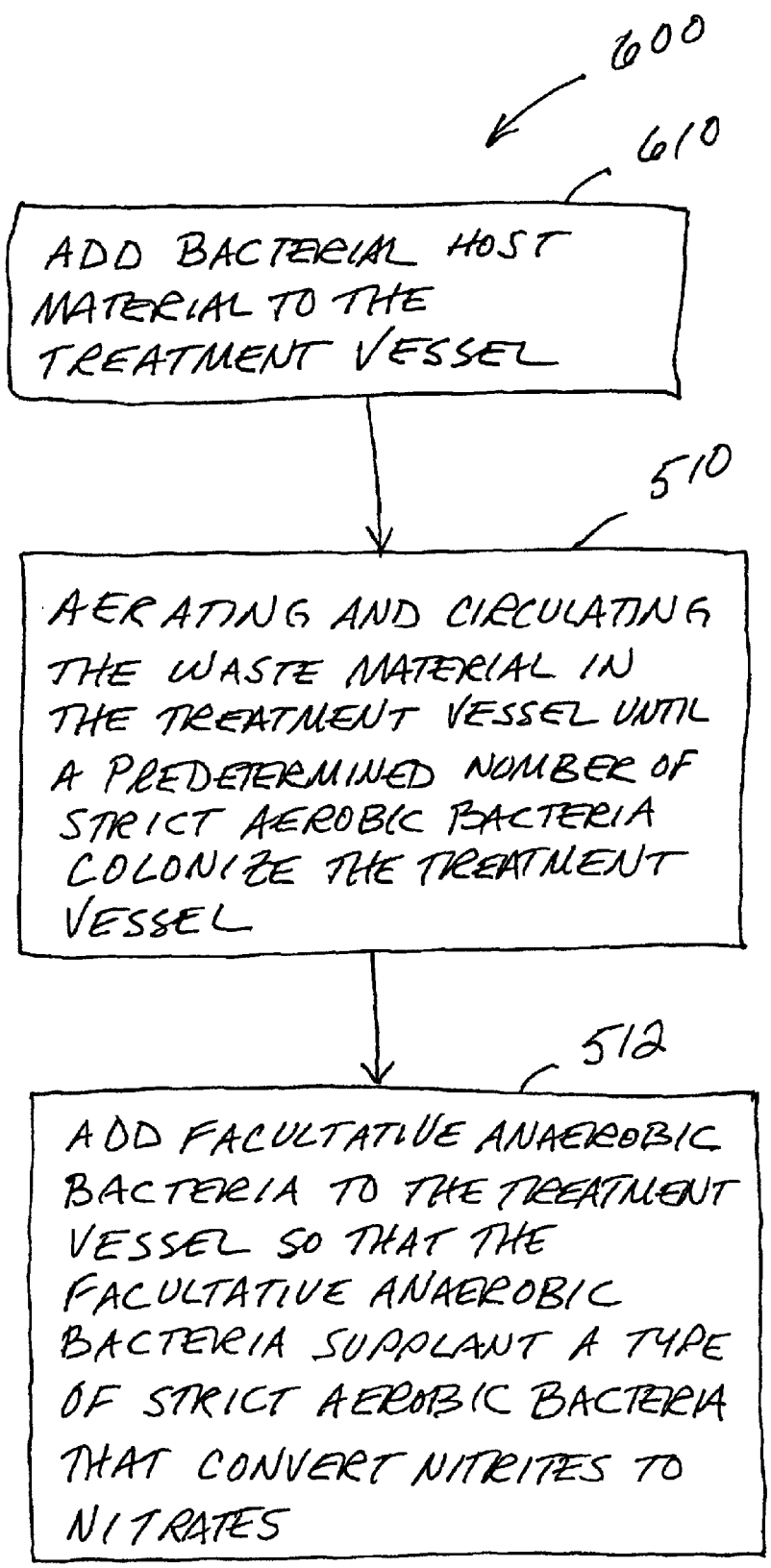
FIG. 6 is a flow chart illustrating a method 600 in accordance with the present invention.

FIG. 6 shows a flow chart that illustrates a method 600 in accordance with the present invention. Method 600 is similar to method 500 and, as a result, utilizes the same reference numerals to designate the steps that are common to both methods. As shown in FIG. 6, method 600 differs from method 500 in that method 600 includes step 610 which adds a bacterial host material to the treatment vessel.

The bacterial host material added in step 610 is the same as that added in step 410. As a result of the bacterial host material, method 600 supports greater concentrations of the first type of strict aerobic bacteria and the facultative anaerobic bacteria than does method 500.

Figure 7:
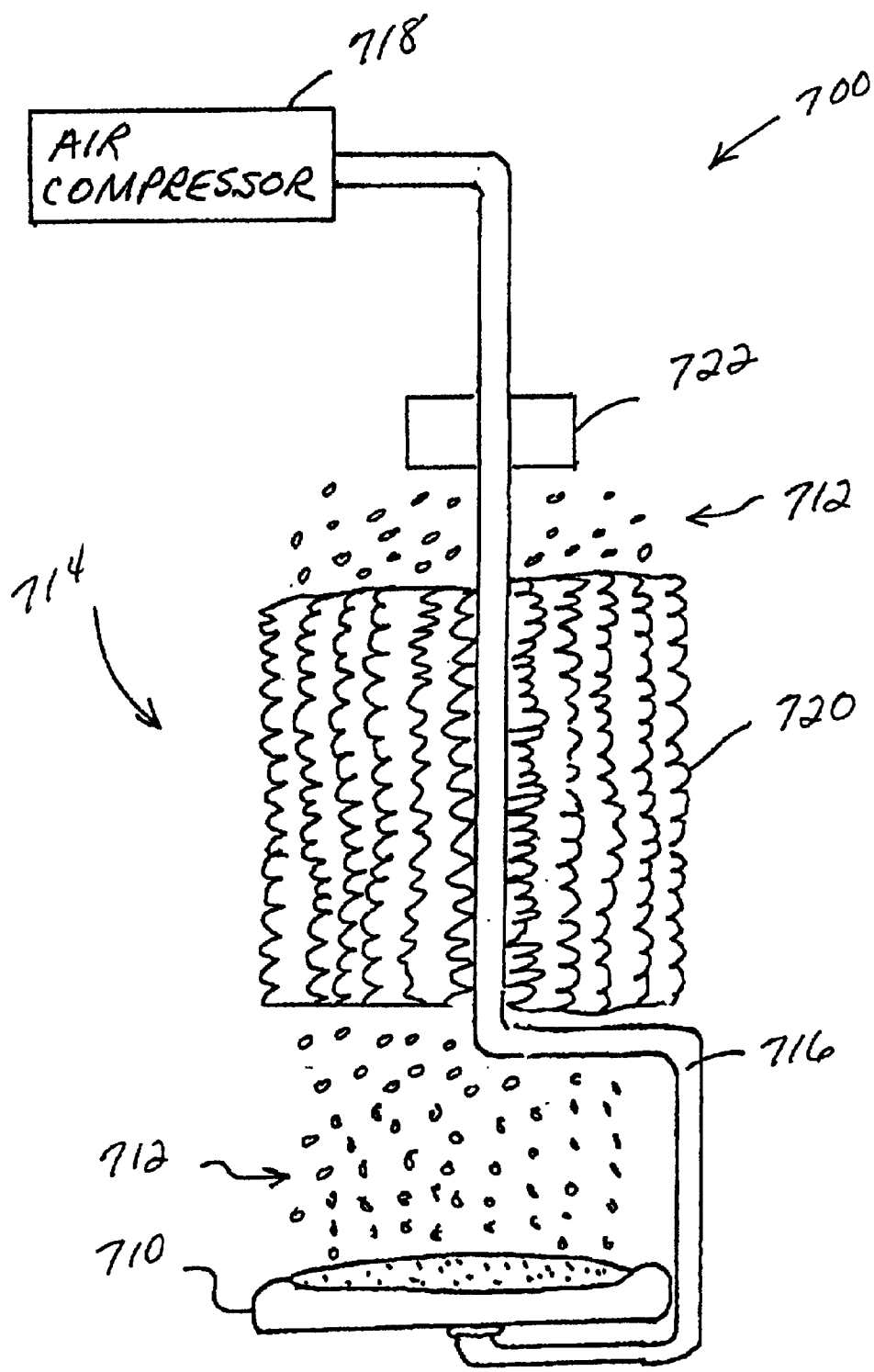
FIG. 7 is a cross-sectional view illustrating a waste treatment device 700 in accordance with the present invention.

FIG. 7 shows a cross-sectional view that illustrates a waste treatment device 700 in accordance with the present invention. Waste treatment device 700 is an example of a device that can be used to implement the methods of the present invention.

As shown in FIG. 7, waste treatment device 700 includes an air diffuser 710 that aerates and circulates the waste material. Diffuser 710 has an air input side and a bubble output side. In addition, diffuser 710 provides bubbles of air 712 evenly across the diameter of a column 714 that extends away from the bubble output side of diffuser 710. Diffuser 710 can provide micro-fine, fine, medium, or course bubble sizes.

Waste treatment device 700 also includes a compressed air line 716 that is connected to the air input side of air diffuser 710, and an air compressor (or blower) 718 that is connected to compressed air line 712. Compressor 714, which is located a distance away from diffuser 710, can be implemented with, for example, a 40-watt compressed air pump. Line 716 provides diffuser 710 with pressurized air pumped from compressor 718.

In the example shown in FIG. 7, line 716 extends around from the input side to the bubble side of air diffuser 710, and then extends away from the bubble side in column 714 that extends away from diffuser 710. Diffuser 710 is preferably implemented with a micro-fine bubble diffuser because a micro-fine diffuser can inject more oxygen into a stream of effluent at a lower air pressure which, in turn, lowers the operating requirements of compressor 718.

Waste treatment device 700 optionally includes a bacterial host material 720 that is positioned within column 714 that extends away from diffuser 710. Material 720 is positioned a predetermined distance away from the bubble output side of diffuser 710, measured normal to the surface of the bubble output side. Material 720 can be any material that provides a surface area for bacteria to grow and that water can pass through without clogging.

Material 720 is preferably manufactured from a material that is resistant to decay, and configured and placed within the column in a fashion that provides the maximum possible film forming surface area within the volume of the column. Material 720 is placed to allow for the free flow of bath liquid and air through material 720. For example, material 720 can be implemented with a sheet of cuspated plastic material.

Waste treatment device 700 additionally includes a bacteria container/applicator 722 that is positioned within column 714 that extends away from diffuser 710. Container 722 is positioned a predetermined distance away from the bubble output side of diffuser 710, measured normal to the surface of the bubble output side. Bacteria container/applicator 722 includes a porous sack or any other similar packaging which can contain a bacterial starter culture allowing timed release of viable bacteria over a prolonged period or the outlet end of a tube or other means to deliver bacteria from an external source.

To maintain the position of bacterial host material 720 and bacteria container/applicator 722 within the column that extends away from diffuser 710, material 720 and container/applicator 722 can be connected to air line 716. Alternately, device 700 can include a frame or structure to provide the necessary positional relationships.

Figure 8:
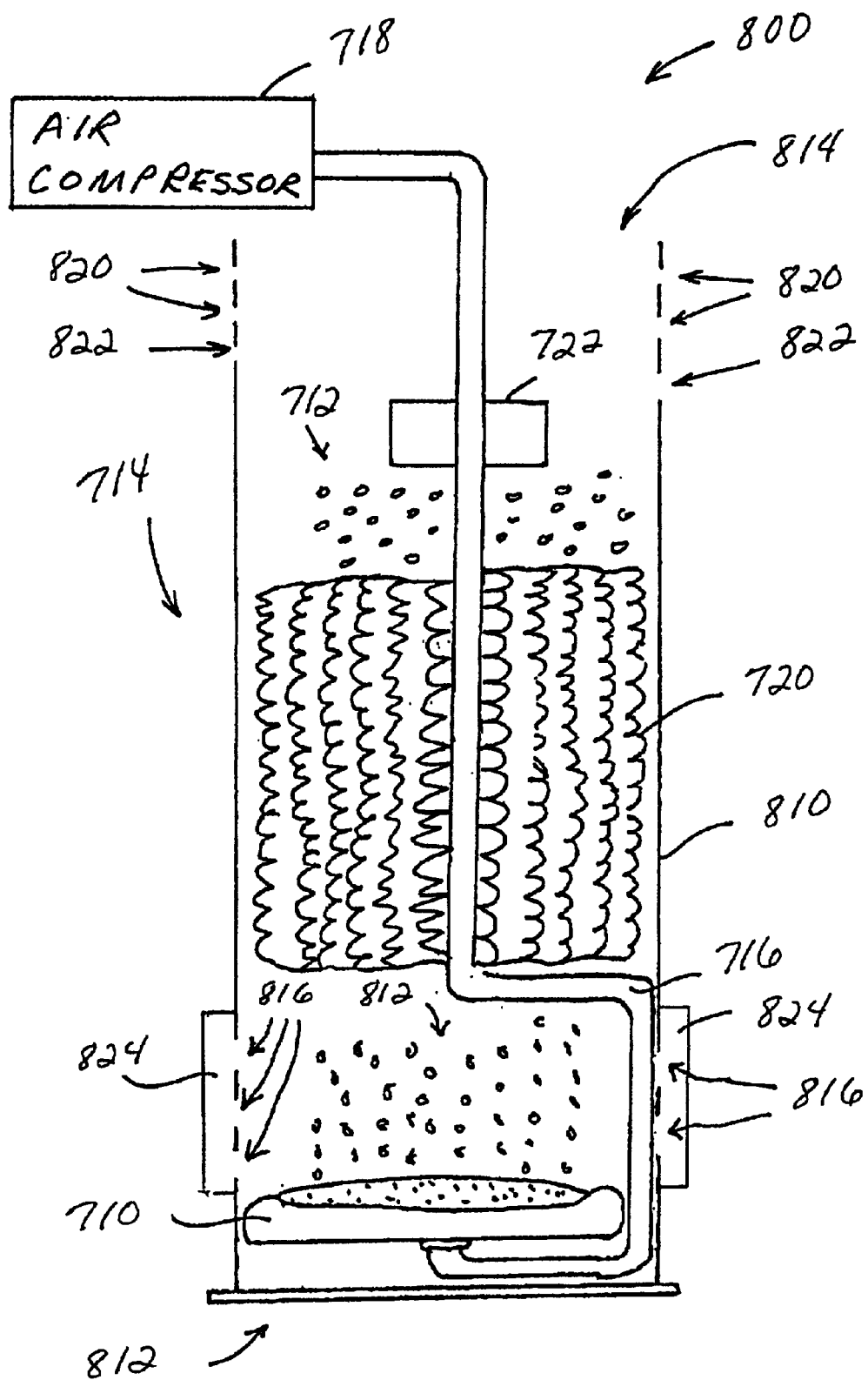
FIG. 8 is a cross-sectional view illustrating a waste treatment device 800 in accordance with the present invention.

FIG. 8 shows a perspective view that illustrates a waste treatment device 800 in accordance with the present invention. Device 700 is similar to device 700 and, as a result, utilizes the same reference numerals to designate the structures which are common to both devices.

As shown in FIG. 8, waste treatment device 800 differs from device 700 in that device 800 includes a column-shaped housing 810 that has a bottom end 812 and a top end 814. Bottom end 812 can be opened or closed (can be covered by a plate to prevent an intake flow from directly beneath device 800 or can be left open to allow such flow).

In the example shown in FIG. 8, the side walls of housing 810 are solid except for a number of input and output openings. As shown in FIG. 8, housing 810 can include input openings 816 that are formed through and around the side wall of housing 810 adjacent to bottom end 812. Further, housing 810 can include output openings 820 that are formed through and around the side wall of housing 810 adjacent to top end 814. Housing 810 can additionally include a number of output openings 822 that are formed through and around the side wall of housing 810 at positions spaced away from top end 814.

Housing 810 can be constructed from any material that is capable of withstanding a corrosive environment, with a circular, or other shaped cross-section. Housing 810 can be formed to have a variable buoyancy for floating at a predetermined depth within the liquid in a treatment vessel. Housing 810 can be implemented with, for example, a section of PVC pipe.

As shown in FIG. 8, air diffuser 710, air line 716, bacterial host material 720, and bacteria container/applicator 722 fit within housing 810 such that air diffuser 710 is adjacent to bottom end 812, and column 714 that extends away from the bubble surface of diffuser 710 fits within column-shaped housing 810. In the example of FIG. 8, bacterial host material 720 and bacteria container/applicator 722 can be connected to housing 810 and/or air line 716.

In addition, waste treatment device 800 can optionally include a filter material 824 that is formed around housing 810 to cover openings 816. The lower outside portion of housing 810 can be wrapped in filter material 824 to prevent material from entering housing 810 that can clog device 800. The same material used to implement bacteria host material 720 within housing 810, or a similar material, can be wrapped around the outside of the perforated portion of housing 810 to act as a filter to prevent device 800 from becoming clogged.

Air line 716 can run from diffuser 710 to top end 814 along any radial position, such as along the longitudinal centerline of housing 810, as shown in FIG. 8, or along the inner side wall of housing 810. Air line 716 can also run through the side wall of housing 810 and run up the outer side wall surface of housing 810.

Figure 9:
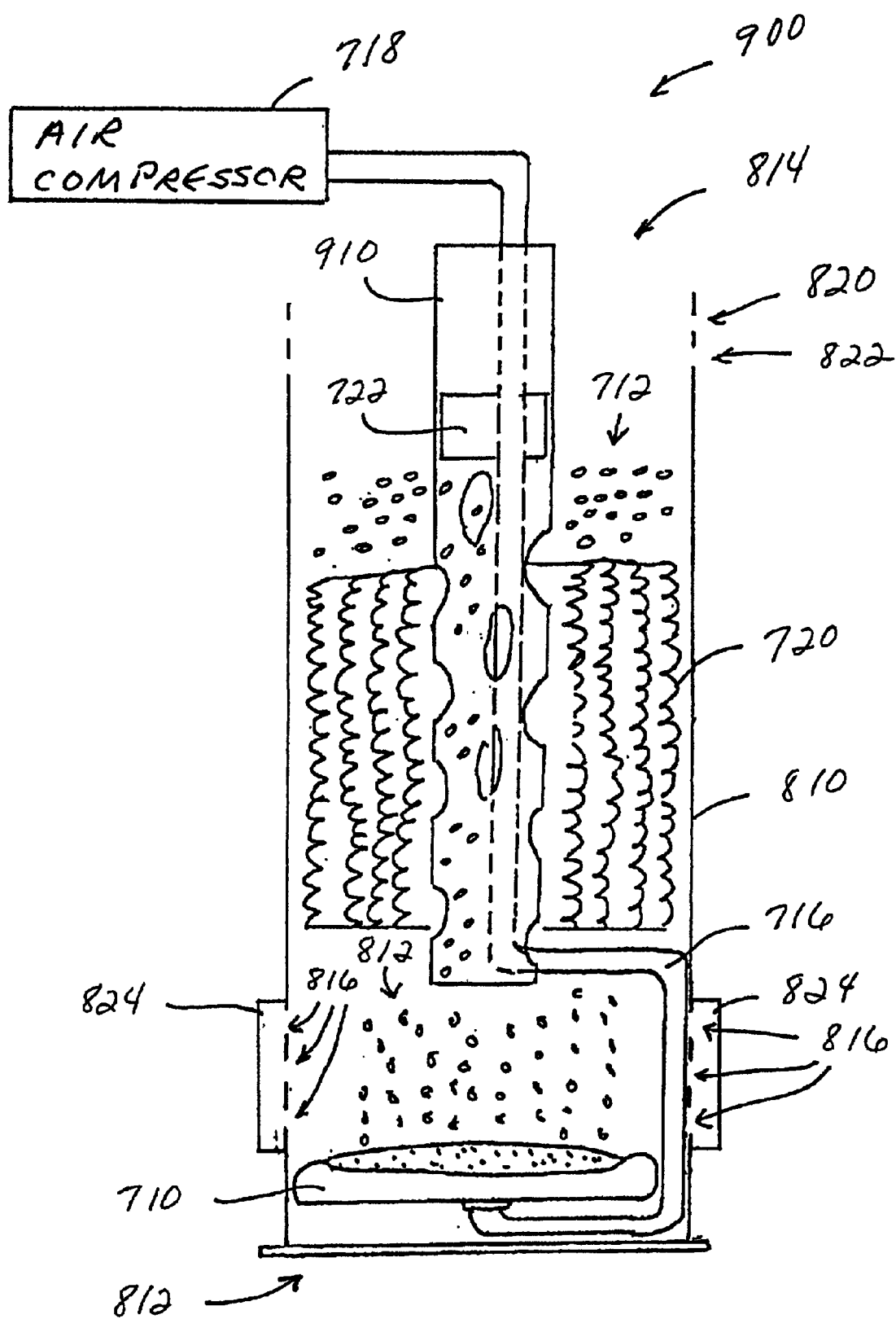
FIG. 9 is a cross-sectional view illustrating a waste treatment device 900 in accordance with the present invention.
Figure 10:
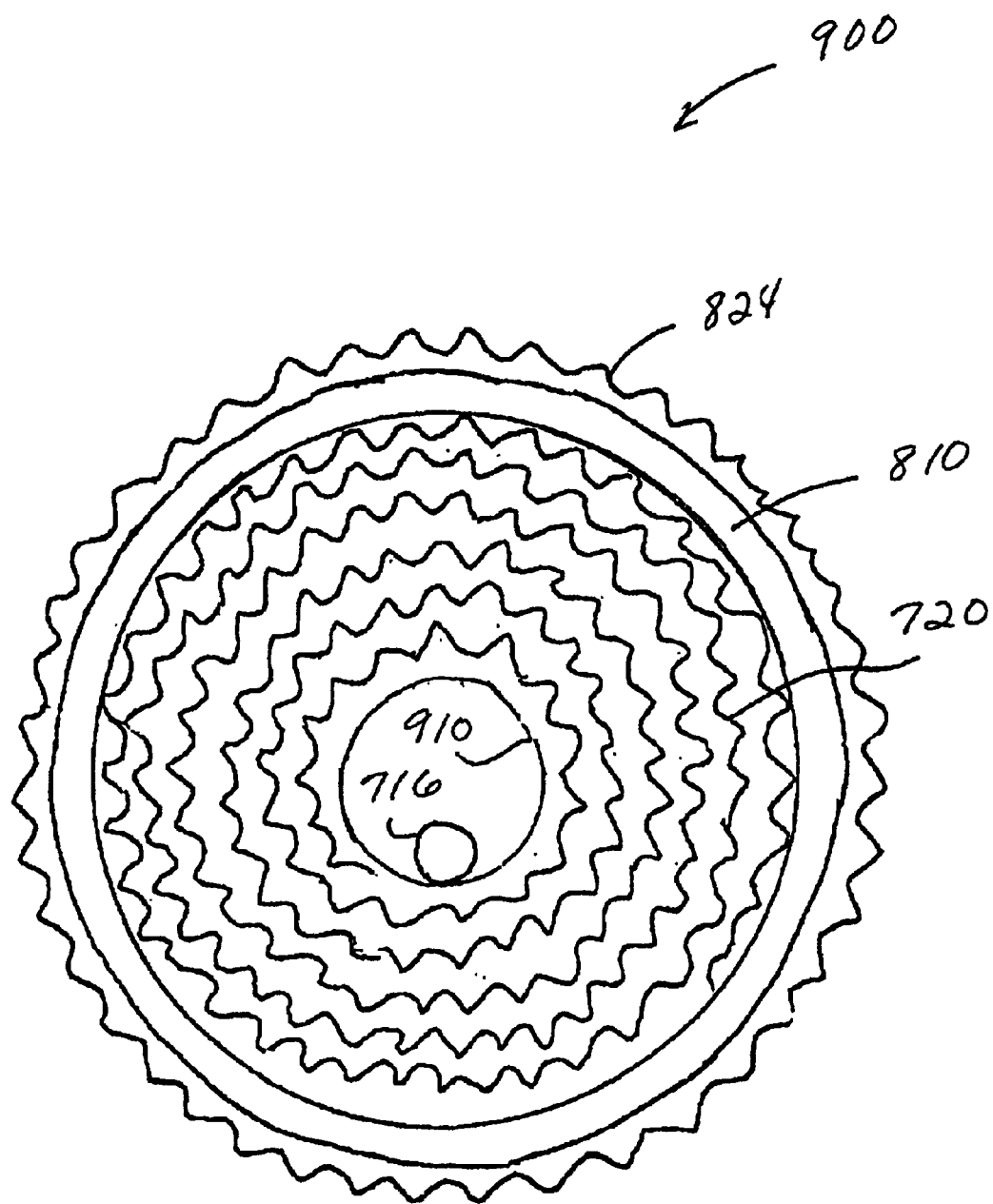
FIG. 10 is a plan view illustrating waste treatment device 900 in accordance with the present invention.

FIG. 9 shows a cross-sectional view that illustrates a waste treatment device 900 in accordance with the present invention. FIG. 10 shows a plan view that illustrates waste treatment device 900 in accordance with the present invention. Device 900 is similar to device 800 and, as a result, utilizes the same reference numerals to designate the structures which are common to both devices.

As shown in FIGS. 9 and 10, waste treatment device 900 differs from device 800 in that device 900 includes a vertical pipe 910 that is open at both ends and perforated with holes along the side to allow a flow of effluent into and through pipe 910. (Pipe 910 can alternately be open at both ends with no holes along the side.) In the example shown in FIGS. 9 and 10, pipe 910 is positioned parallel to the longitudinal centerline of housing 810 at a predetermined height above diffuser 710, and extends up and out of housing 810.

Pipe 910 has a smaller dimension than the column of housing 810. Pipe 910 is suspended a predetermined distance above air diffuser 710 so a portion of the air lift flow (bubbles and effluent) can pass through pipe 910. Further, line 716 can run inside pipe 910 as shown in FIG. 9, or between the inside surface of housing 810 and the outside surface of pipe 910.

Bacteria container/applicator 722 fits into pipe 910, and is suspended within pipe 910 by, for example, an attached line that allows easy retrieval and replacement of container 922 on a periodic basis depending on the duration of viability of the starter culture. Container/applicator 722 can be placed at any position within pipe 910. (Pipe 910 can also include a stop which limits the vertical descent of container/applicator 722 into pipe 910.)

In addition, bacteria host material 720 can be wrapped around pipe 910, thereby stabilizing pipe 910 within the center of housing 810. In this way, bacteria host material 720 provides a matrix with extensive surface area for bacteria generated in pipe 910 to form a fixed bacterial film within the column. The radial arrangement of the cuspated matrix allows for even diffusion of both air and water up through the matrix.

This allows passage of effluent and air driven by the airlift both up between the layers and laterally through the layers for circulation of food and air to bacteria generated within pipe 910. The bacteria generated within pipe 910 can then colonize the surface area as a fixed film and be dispersed with the flow from the device.

The design or material used in the construction of the airlift column shall be such that it allows adjustment of the specific gravity of the device and its contents to achieve positive, negative, or neutral buoyancy depending upon the application. The device can be manufactured with varying cross-section shapes, diameters, heights, or other dimensions to accommodate different levels of treatment or different sizes and configurations of treatment vessels within which the device is placed.

The operations of waste treatment devices 700, 800, and 900 are substantially the same. As a result, operation is described with respect to device 900 with relevant differences between the devices noted.

Prior to operation, waste treatment device 900 is placed in a waste treatment vessel, such as a septic tank or a municipal treatment tank, so that the bubble surface of air diffuser 710 is substantially horizontal and facing up. Device 900 can be suspended from the top surface of the treatment vessel or some other structure positioned above the vessel. Device 900 can also sit on the floor of the treatment vessel, or be set to have a specific buoyancy.

Figure 11:
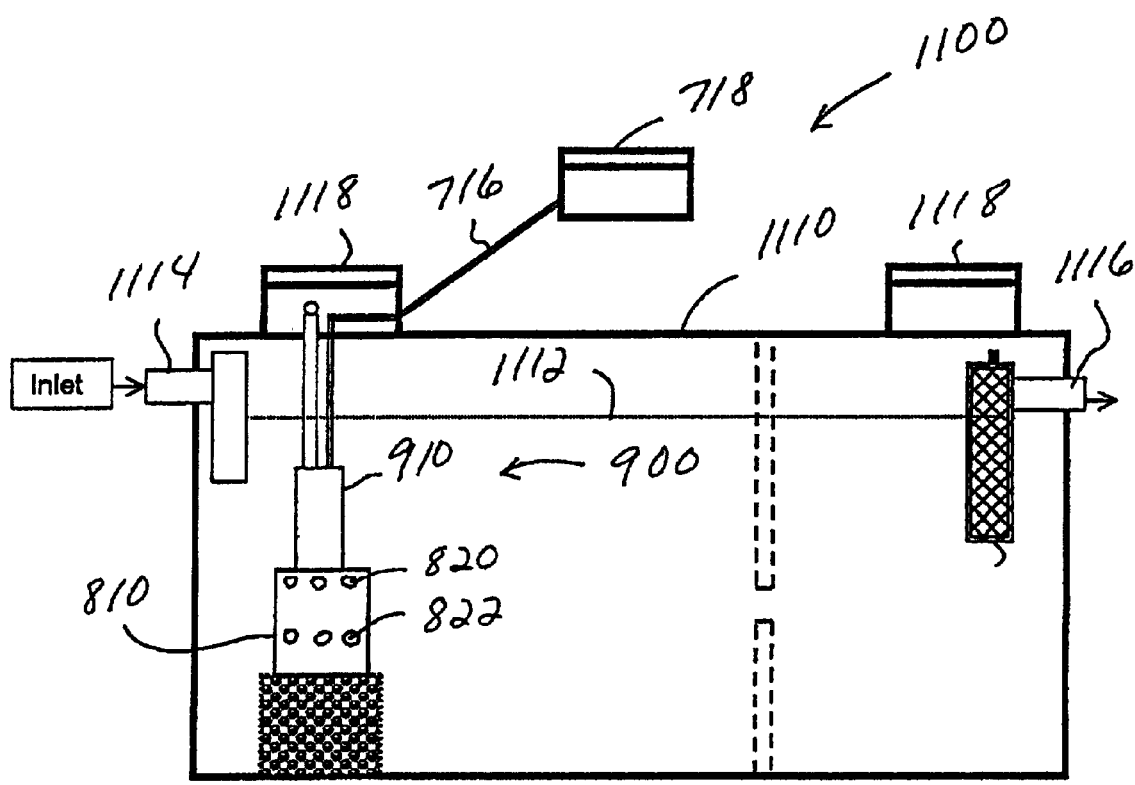
FIG. 11 is a cross-sectional view illustrating a waste treatment system 1100 in accordance with the present invention.

FIG. 11 shows a cross-sectional view that illustrates a treatment system 1100 in accordance with the present invention. In the example shown in FIG. 11, system 1100 includes a treatment vessel 1110, such as a two-compartment septic tank (a one compartment tank can also be used), that receives waste material 1112, and waste treatment device 900 (devices 700 and 800 can also be used) that sits on the floor of vessel 1110.

As shown in FIG. 11, when positioned within vessel 1110, housing 810 and pipe 910 can sit below the top surface of waste material 1112. Alternately, the top end of housing 810 and pipe 910 can sit above the top surface of waste material 1112 as long as openings 822 remain below the top surface.

Openings 822 allow device 900 to be used in treatment vessels with varying depths. In a shallow treatment vessel, circulating effluent exits from openings 822 when the effluent level lies below the top surface of housing 810. In addition, vessel 1110 includes an inlet 1114, an outlet 1116, gas tight service risers 1118, and an effluent outlet filter 1120 to retain non-biodegradable materials.

In operation, column 714 (see FIG. 9) is aerated by bubble diffuser 710 (placed at or near bottom end 812), which disperses air provided to it under pressure. The air pressure can be adjusted depending on the depth of diffuser 710 and the organic load. When pressurized air is input to diffuser 710, a stream of bubbles rises up to the surface of the waste treatment vessel through bacteria host material 720 and past bacteria container/applicator 722. The rising stream of bubbles 712 causes effluent inside column 714 to rise due to air lift.

This creates a flow or circulation where device 900 pulls in effluent through openings 816 and/or bottom end 812, and discharges effluent through openings 820/822 and/or top end 814. The contents of the treatment vessel are circulated through device 900 a large number, such as 30 times, a day. Openings 816, 820, and 822 can be adjusted for number, size, and/or location to achieve different treatment effects. Devices 800 and 900 are more efficient than device 700 because housing 810 confines the stream of bubbles 712 to within housing 810.

The start-up operation of device 900 depends on whether device 900 is to be used in a septic tank or a municipal holding vessel. When device 900 is used in a municipal treatment vessel, start up occurs in two steps. During the first step, a strictly aerobic nitrifying bacteria is grown on bacteria host material 720. Once the strictly aerobic nitrifying bacteria have sufficiently colonized bacteria host material 720, a facultative anaerobic de-nitrifying bacteria is then grown on bacteria host material 720.

The strictly aerobic nitrifying bacteria can be grown in two different ways. In the first way, pressurized air is introduced into diffuser 710 such that a column of bubbles rises from diffuser 710 and passes through material 720. This process continues for a period of one-to-three months during which no bacteria culture is introduced via bacteria container 722.

During this one-to-three month time, wild spores from the outside air, which is pumped into diffuser 710 from compressor 718, are introduced into the effluent circulating in the treatment vessel via the column of bubbles rising from diffuser 710. Along with these wild spores are ammonia oxidizing and nitratifying bacteria which convert ammonia to nitrites, and nitrites to nitrates.

The ammonia oxidizing and nitratifying bacteria within the air and waste material bubbling past host material 720 are caught by material 720. Once caught by material 720, the strictly aerobic nitrifying bacteria begin to thrive and grow. The nitrifying aerobic culture thrives and is able to colonize bacteria host material 720 because the volume of air rising from diffuser 710 creates an aerobic condition. Thus, in the first way, a colony of strict aerobes is introduced from wild spores in the aeration stream (in the bubbles).

The second way of growing nitrifying bacteria is to introduce an inoculum including commercial preparations of a strictly aerobic ammonia oxidizing genera, such as Nitrosomonas or Nitrococcus, into the treatment vessel via bacteria container/applicator 722. The air bubbles rising up through pipe 910 release the strictly aerobic nitrifying bacteria from container/applicator 722. The released nitrifying bacteria circulate through the treatment vessel with the effluent and are caught by material 720.

Once caught by material 720, the aerobic nitrifying bacteria begin to thrive and grow. As above, the nitrifying aerobic culture thrives and is able to colonize bacteria host material 720 because the volume of air rising from diffuser 710 creates an aerobic condition.

Once the concentration of nitrate in the treatment vessel contents is greater than, or equal to, the concentration of ammonia, the facultative anaerobic de-nitrifying bacteria are grown on host material 120. The de-nitrifying bacteria are grown by introducing a facultative anaerobic culture, such as Pseudomonas, Bacillus, or any similar genera, into the effluent. A facultative anaerobic culture is a culture that thrives and reproduces in an aerobic or oxygen rich condition, but which can survive for a period of time in an anaerobic or oxygen poor condition.

This can be done, for example, by placing a bacterial culture into bacteria container/applicator 722, which is then introduced into pipe 910 and allowed to sink into the contained liquid. Bacteria container/applicator 722 is attached to a string or similar device, which passes up and out of the treatment vessel so that bacteria container/applicator 722 can be retrieved and changed on a prescheduled basis.

Bacterial culture can also be introduced into pipe 910 or bacteria/applicator 722, in liquid or other form, by means of tubing which delivers bacterial from an external source or by means of delivery of bacteria directly into the contents of the treatment vessel or into the waste stream flowing into the treatment vessel.

The air bubbles 712 rising up through pipe 910 cause the facultative anaerobic culture to be released from bacteria container/applicator 722. The released anaerobic bacteria, or bacteria introduced by other means, circulate through the treatment vessel, and eventually get caught by and begin to colonize bacteria host material 720. The facultative anaerobic culture thrives and is able to colonize bacteria host material 720 because the volume of air rising from diffuser 710 creates an aerobic condition.

In accordance with the present invention, the quantity and timed-release nature of the facultative anaerobic bacteria placed in container/applicator 722 is sufficient to replace and supplant the second type of strictly aerobic bacteria that changes nitrites into nitrates. As a result, the first type of strictly aerobic bacteria converts ammonia to nitrites, while the facultative anaerobic bacteria convert the nitrite to nitrogen gas and consume the carbon-based waste material. Thus, the effluent released by the treatment vessel includes substantially no nitrogen.

This is a significant improvement for municipal waste treatment operators. Thus, rather than discharging nitrate and its attendant problems into the surface water systems, a municipal waste treatment operator can now discharge effluent that is substantially free of nitrogen while at the same time reducing or eliminating the solids from the waste stream.

In addition to digestion of the carbon-based material taking place on bacterial host material 720, circulation of the effluent within the treatment vessel, which is rich in facultatively anaerobic bacteria, can be directed to the solids settling portion of the septic tank to stimulate an increased rate of anaerobic solids digestion as described in U.S. Pat. No. 5,531,898, which is hereby incorporated by reference.

When device 900 is used in a non-municipal treatment vessel, such as a septic tank, only the second step of growing the facultative anaerobic de-nitrifying bacteria on bacteria host material 720 is performed. In this operation, device 900 is placed in the outlet chamber of a two-chamber septic tank (or near the outlet of a single chamber tank) so that the effluent is aerated and enriched with the facultative anaerobic culture in pipe 910 immediately before the effluent passes to a soil-based disposal trench that has a biomat slime.

As noted above, unlike the strict aerobes in the soil, which are ineffective in breaking down a biomat slime due to the moisture present in the slime, facultative anaerobic bacteria consume the biomat slime. In accordance with the present invention, facultative anaerobic bacteria are added to device 900 via container/applicator 722 in sufficient numbers with a sufficient time release to insure a continual reduction in, and eventual elimination of, the biomat slime.

As noted above, a first type of strict aerobe in the soil converts ammonia to nitrites, while a second type of strict aerobe in the soil converts the nitrites to nitrates. In further accordance with the present invention, facultative anaerobic bacteria are added to device 900 via container 722 in sufficient numbers with a sufficient time release to insure that the facultative anaerobic bacteria vastly outnumber the second type of strict aerobes in the soil in the disposal trench.

As a result, the nitrites in the disposal trench are largely consumed by the facultative anaerobic bacteria rather than the second type of strict aerobe in the soil. When the facultative anaerobic bacteria consume nitrites, the nitrogen is released as nitrogen gas. In addition, the facultative anaerobic bacteria also strip the oxygen from nitrates, breaking the nitrates into nitrites.

Thus, by displacing the second type of strict aerobe in the disposal trench soil with the facultative anaerobic bacteria, device 900 not only eliminates the biomat slime, but also eliminates nitrogen in the form of nitrates from the soil. Eliminating the biomat slime substantially extends the Long Term Acceptance Rate (LTAR) of the soil for effluent.

Thus, effluent maintains soil porosity and LTAR in the soil by minimizing the buildup of "biomat" known to be the main cause of leach system failure. As a result, device 900 allows failed treatment systems to be restored, and prevents ground water sources from being contaminated by near-by treatment systems.

Experimental results indicate that within the first three-to-six inches after the effluent passes from into the aerobic zone of the disposal trench, virtually all ammonia has disappeared and virtually no measurable nitrate or nitrite can be found in the effluent. Thus, the present invention removes ammonia, nitrites, and nitrates from the soil. The aeration of the effluent stream flowing to soil based leach field reduces the biological oxygen demand (BOD) of the effluent stream, and diminishes the nutritive content in the flow.

In device 900, by adjusting air flow within the column, location and dimension of access ports for effluent to enter the column, direction and volume of flow of the bacterial colony generated within the column to other areas of treatment, and initial placement of the device within a treatment stream, the system can be adapted to achieve independent treatment goals.

Thus, the stream of bubbles allows a facultative anaerobic bacterial film originating from bacteria container 722 (the culture container) to form, be maintained, and grow in the column. Air flow within device 900 can be set to achieve circulation and aeration within the treatment vessel sufficient to achieve aerobic treatment of the entire vessel contents, or culturing facultative bacteria which are then dispersed outside the column for anaerobic digestion.

Thus, device 900 removes nitrogen from the effluent stream, inoculates the disposal trench with a bacterial culture that consumes the waste in the effluent stream, de-nitrifies the soil, and reduces the BOD on the soil. As a result, a dead leach field can be recovered while nitrogen is removed the effluent stream without any environmental impact.

In an alternate embodiment of the present invention, the nitrification and de-nitrification process can take place in isolated areas of the treatment vessel, or in separate vessels. For example, maximizing aeration in an isolated portion of a treatment system can increase the rate of nitrification, while directing the resultant nitrified flow from the device to a separate vessel, or remote portion of the original vessel, which is anaerobic in nature, to encourage bacterial de-nitrificcation to occur.

Appurtenances can be attached to the waste treatment devices of the present invention which allows a flow rich in generated bacteria from the airlift column to be split to other portions of the treatment vessel or to other treatment vessels or other locations where bacterial treatment can occur. This can be done either by attaching a pipe from the overflow area at the top of the column which allows such flow, or by installing a pump or dedicated separate airlift column attached adjacent to the device for directing such flow through a pipe to other locations.

Figure 12:
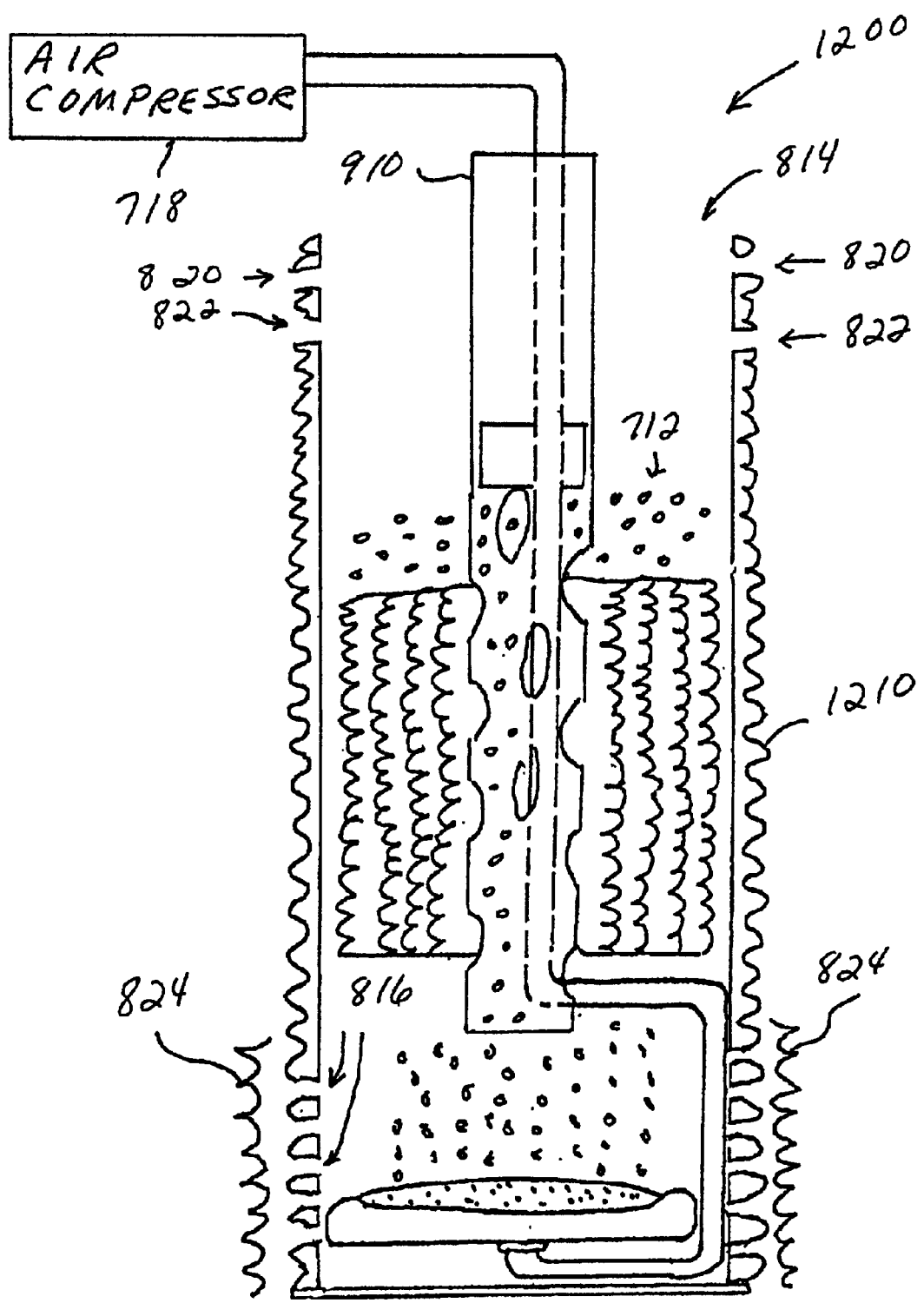
FIG. 12 is a plan view illustrating waste treatment device 1200 in accordance with the present invention.

In the preferred embodiment of devices 800 and 900, housing 810 is implemented with a section of circular PVC plastic pipe with a smooth inner and outer surface. Alternately, corrugated plastic culvert material with a smooth interior and sealed, hollow corrugation rings can also be used. FIG. 12 shows a cross-sectional view that illustrates a waste treatment device 1200 in accordance with the present invention.

Device 1200 is similar to device 900 and, as a result, utilizes the same reference numerals to designate the structures which are common to both devices. As shown in FIG. 12, waste treatment device 1200 differs from device 900 in that device 1200 includes a number of corrogation rings 1210. A specific number of corrogation rings 1210 at bottom end 812 are perforated at a single point to allow introduction of sand or other material of a greater density than water. A specific number of rings at the top are left sealed to maintain a particular positive buoyancy while the rings in between are perforated to allow water from the surrounding effluent to fill them. Using a particular combination of the above methods, the column can be adjusted to float at various predetermined heights. With such adjustment, rate of flow of effluent through the column can be regulated.

Use of this device allows the generation of a continuous supply of bacterial colonies that are capable of degrading the slime component of the biological buildup within mound-type disposal systems or other soil infiltration type disposal systems.

The present invention can be used in a wide variety of applications. Such applications include, but are not limited to, septic tanks, cesspools, leach pits, grease traps, anaerobic or aerobic digesters, activated sludge treatment plants, agricultural or domestic waste treatment ponds, Imhoff tanks, bioremediation of contaminated soil using applied culteres of bacteria through landfarming or in situ injection, bioremediation of contaminated spills in streams or lakes, algae control in lakes, streams, fish ponds or aquaculture ponds, or any other instance where inoculation with desired bacterial species is required or advantageous.

It should be understood that various alternatives to the method of the invention described herein may be employed in practicing the invention. Thus, it is intended that the following claims define the scope of the invention and that methods and structures within the scope of these claims and their equivalents be covered thereby.

What is claimed is:

1. A method of recovering a soil-based disposal trench that has a biomat slime, the method comprising the step of adding facultative anaerobic bacteria to an effluent that flows into the disposal trench.

2. The method of claim 1 wherein the facultative anaerobic bacteria added to the effluent consumes the biomat slime faster than the biomat slime can be formed.

3. The method of claim 1 wherein the facultative anaerobic bacteria added to the effluent stream substantially replace strict aerobic bacteria in the disposal trench that convert nitrites to nitrates.

4. The method of claim 1 wherein the effluent flows from a treatment vessel that holds a waste material.

5. The method of claim 4 wherein the step of adding facultative anaerobic bacteria to an effluent that flows into the disposal trench includes:
   circulating the waste material in the treatment vessel, the waste material including the effluent, the effluent including anunonia; and
   adding facultative anaerobic bacteria to the treatment vessel, circulation of the waste material causing the effluent that flows into the disposal trench to include facultative anaerobic bacteria.

6. The method of claim 5 wherein the facultative anaerobic bacteria added to the effluent consume the biomat slime faster than the biomat slime can be formed.

7. The method of claim 5 wherein the facultative anaerobic bacteria added to the effluent substantially replace strict aerobic bacteria in the disposal french that convert nitrites to nitrates.

8. The method of claim 4 wherein the step of adding facultative anaerobic bacteria to an effluent that flows into the disposal trench includes:
   aerating and circulating the waste material in the treatment vessel, the waste material including the effluent, the effluent including ammonia; and
   adding facultative anaerobic bacteria to the treatment vessel, circulation of the waste material causing the effluent that flows into the disposal trench to include facultative anaerobic bacteria.

9. The method of claim 8 wherein the aerating and circulating step is performed with an aerator bubbling air in the treatment vessel.

10. The method of claim 9 wherein the aerating and circulating step substantially reduces, or eliminates, a number of anaerobic bacteria that are present in the treatment vessel.

11. The method of claim 8 and further comprising the step of adding a bacterial host material to the treatment vessel, the facultative anaerobic bacteria colonizing the bacterial host material.

12. The method of claim 11 wherein the aerating and circulating step causes an air and waste material flow, and the bacterial host material is placed to be bathed in the air and waste material flow.

13. The method of claim 11 wherein the aerating and circulating step forms an aerobic region within the vessel that supports the growth of the facultative anaerobic bacteria.

14. The method of claim 13 wherein the facultative anaerobic bacteria are added to the treatment vessel in numbers which allow the facultative anaerobic bacteria to become the dominant, if not the exclusive, bacteria that are present in the aerobic region.

15. A method of recovering a soil-based disposal trench that has a biomat slime, the trench receiving effluent that flows from a waste treatment vessel that holds a waste material, the method comprising:

provide a bacteria host material in the waste treatment vessel;

aerating the waste material within the waste treatment vessel, the aerating step including allowing air to pass through the bacteria host material;

allowing a nitrifying aerobic culture to colonize the bacteria host material;

introducing a facultative bacteria culture into the waste treatment vessel such that facultative anaerobic bacteria grows on the bacteria host material and supplants the nitrifying aerobic culture; and immersing the bacteria host material having the facultative anaerobic bacteria grown thereon in the effluent so that effluent released by the treatment vessel contains the facultative anaerobic bacteria.

16. The method of claim 15, further comprising circulating the waste material within the waste treatment vessel.

17. The method of claim 15, wherein the step of introducing the facultative bacteria culture includes:

placing the facultative bacteria culture in a container; and passing the container into the treatment vessel through a pipe.

18. The method of claim 15, wherein the step of introducing the facultative bacteria culture includes delivering the facultative bacteria culture into the contents of a waste stream flowing into the treatment vessel.

19. The method of claim 15, wherein the facultative bacteria culture includes species of the Pseudomonas genera that are capable of surviving in an anaerobic environment.

20. The method of claim 15, wherein the facultative bacteria culture includes species of the Bacillus genera that are capable of surviving in an anaerobic environment.

* * * * *